United States Patent
Mori

[11] Patent Number: 5,085,484
[45] Date of Patent: Feb. 4, 1992

[54] VEHICLE UNDERFRAME STRUCTURE FOR REDUCING TORSIONAL DEFORMATION THEREOF

[75] Inventor: Takeo Mori, Susono, Japan

[73] Assignee: Toyota Jidosha Kabushiki Kaisha, Toyota, Japan

[21] Appl. No.: 481,228

[22] Filed: Feb. 20, 1990

[30] Foreign Application Priority Data

Feb. 20, 1989 [JP] Japan ................ 1-18541[U]

[51] Int. Cl.⁵ .............................................. B62D 21/02
[52] U.S. Cl. ................................ 296/204; 280/788; 296/203
[58] Field of Search ................ 296/187, 203, 204, 205; 280/788, 791

[56] References Cited

U.S. PATENT DOCUMENTS

| | | | |
|---|---|---|---|
| 1,475,332 | 11/1923 | Wales | 296/203 X |
| 1,523,636 | 1/1925 | Dunn | 296/203 |
| 1,694,572 | 12/1928 | Weymann | 296/203 |
| 2,140,476 | 12/1938 | Ledwinka | 296/204 |
| 2,389,907 | 11/1945 | Helmuth | 296/203 |
| 2,668,722 | 2/1954 | Müller | 296/203 X |
| 2,851,302 | 9/1958 | Owen | 296/204 |
| 3,829,118 | 8/1974 | Gouirand | 280/788 |
| 3,940,176 | 2/1976 | Ito et al. | 296/204 X |
| 4,355,844 | 10/1982 | Fantini Muzzarelli | 296/205 |
| 4,428,599 | 1/1984 | Jahnle | 296/204 X |
| 4,440,435 | 4/1984 | Norlin | 296/188 |
| 4,570,973 | 2/1986 | Ewers et al. | 296/204 X |

FOREIGN PATENT DOCUMENTS

| | | | |
|---|---|---|---|
| 76477 | 4/1985 | Japan | 296/204 |
| 11279 | 1/1988 | Japan | . |

Primary Examiner—Dennis H. Pedder
Assistant Examiner—Andrew C. Pike
Attorney, Agent, or Firm—Cushman, Darby & Cushman

[57] ABSTRACT

A vehicle framing structure has elongated side sills longitudinally disposed in the lower portions of a vehicle, spring supports longitudinally disposed either at the front or in the rear portions of the sills, or both, and side members having one end connected to the sills and the other end connected to the spring supports, the side members having straight line axes when viewed in a plan view. The arrangement reduces torsional deformation of the side members and improves rigidity in the connection between the sills and the spring supports.

13 Claims, 21 Drawing Sheets

F I G. 10
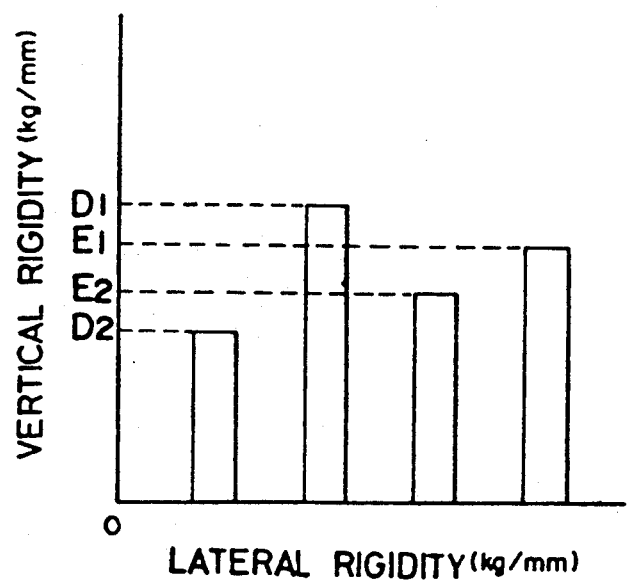

FREQUENCY (Hz)
VERTICAL VIBRATION
OF SPRING SUPPORT

VEHICLE UNDERFRAME STRUCTURE FOR REDUCING TORSIONAL DEFORMATION THEREOF

BACKGROUND OF THE INVENTION

1. Field of the Invention

The present invention relates to the underframe structure of a vehicle including the portion joining the main body of the vehicle to the front body or the rear body of the same.

2. Related Art Statement

Hitherto, as shown in FIGS. 20 and 21, a vehicle framing structure has been arranged such that front side members 80 are disposed in the lower portion of the front body in the longitudinal direction of the vehicle, the front side members 80 having rear end portions 80A connected to side sills 82.

Further in the lower portion of the rear body there are provided rear floor side members 88 in the longitudinal direction of the vehicle, the floor side members 88 having front end portions 88A connected to the side sills 82.

However, the front body of the vehicle of the type structured as described above suffers from torsional deformation since the vertically directed portions of the rear end portions 80A of the front side members 80 are bent downwards and also the portions in the transverse (width) direction of the same are bent outward.

Likewise the rear body suffers from torsional deformation since the vertically directed portions of the front end portions 88A of the rear floor side members 88 are bent downwards and the portions directed in the transverse direction of the same are bent outwards.

Therefore, the conventional vehicle framing structure suffers from vibrations at the time of high speed driving due to insufficient rigidity which in particular occurs in joint portions 98 between the main body and the front body and in joint portions 100 between the main body and the rear body.

Technologies relating to the structure as described above have been disclosed in Japanese Utility Model Application Laid-Open No. 63-11279 and U.S. Pat. No. 4,440,435.

SUMMARY OF THE INVENTION

To this end, an object of the present invention is to provide a vehicle framing structure with improved rigidity in the joining of front body to the main body or the joining of the rear body to the main body, or both.

In order to achieve the above-described object, the present invention provides a vehicle framing structure comprising side sills disposed in the longitudinal direction of a vehicle in the lower portions, one at each side of the vehicle, spring supports disposed in the longitudinal direction of the sills, and side members having one of their respective ends connected to the sills and the other of their respective ends connected to the spring supports and having a straight axis when viewed in a plan view.

In the above-described structure according to the present invention, each of the side members establishing a connection between the sills and the spring supports is arranged to have a straight axis when viewed in the plan view. Therefore, the length of the framing structure acted directly upon by the torsional deformation deriving from the side members is reduced, and the rigidity in the corrections between the sills and the spring supports is improved. For example, when the front end portions of the sills and the front spring supports are connected to each other by side members whose axes are arranged to be a straight line when viewed in a plan view, the rigidity in the connection between the main body and the front body is improved. Likewise when the rear end portions of the sills and the rear spring supports are connected to each other by side members whose axes are arranged to be in a straight line when viewed in a plan view, the rigidity in the connection between the main body and the rear body is improved.

BRIEF DESCRIPTION OF THE DRAWINGS

FIG. 10 is a graph which illustrates the vertical rigidity and the lateral rigidity of the body of a vehicle;

DESCRIPTION OF THE PREFERRED EMBODIMENTS

Figure 1:
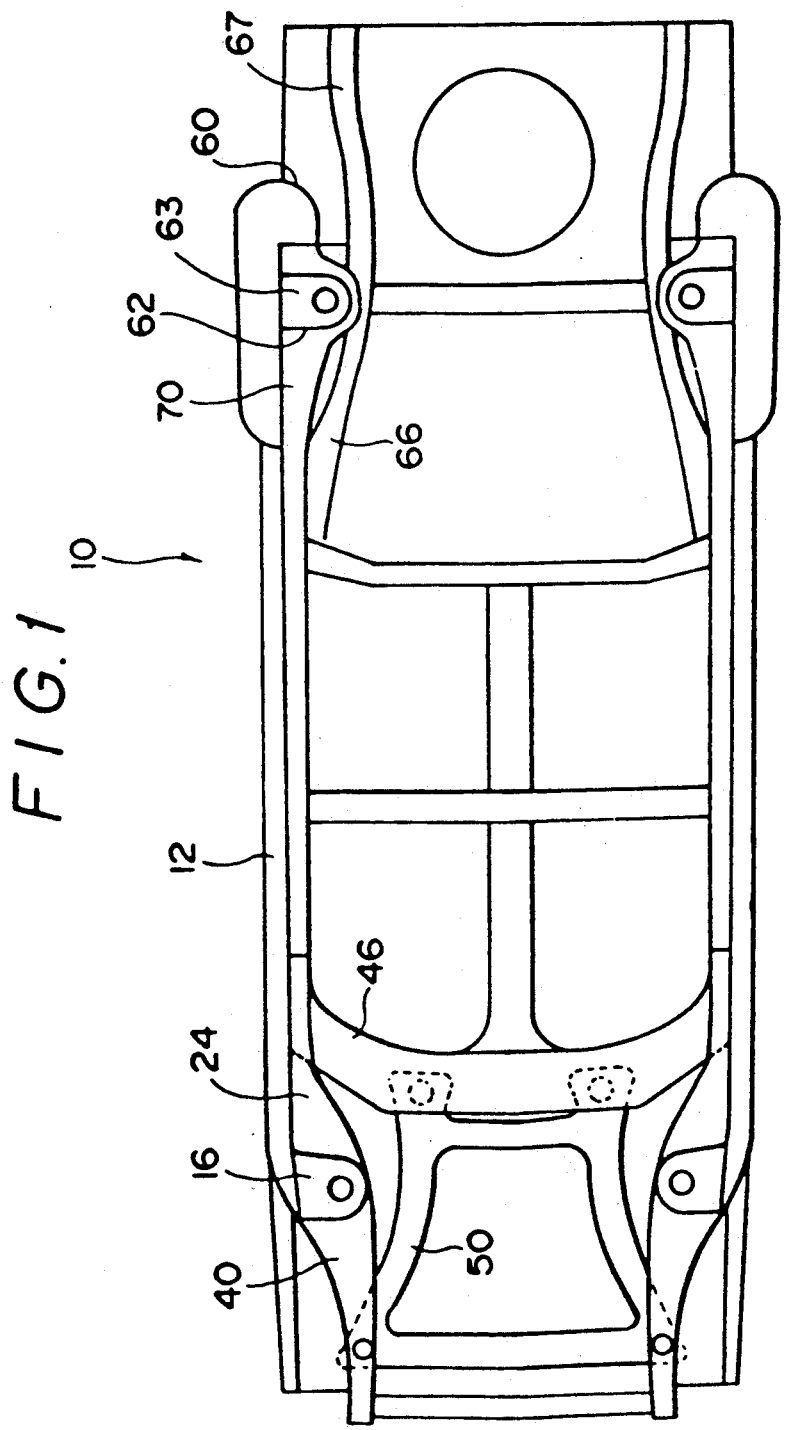
FIG. 1 is a schematic perspective plan view which illustrates a first embodiment of a vehicle framing structure according to the present invention.
Figure 2:
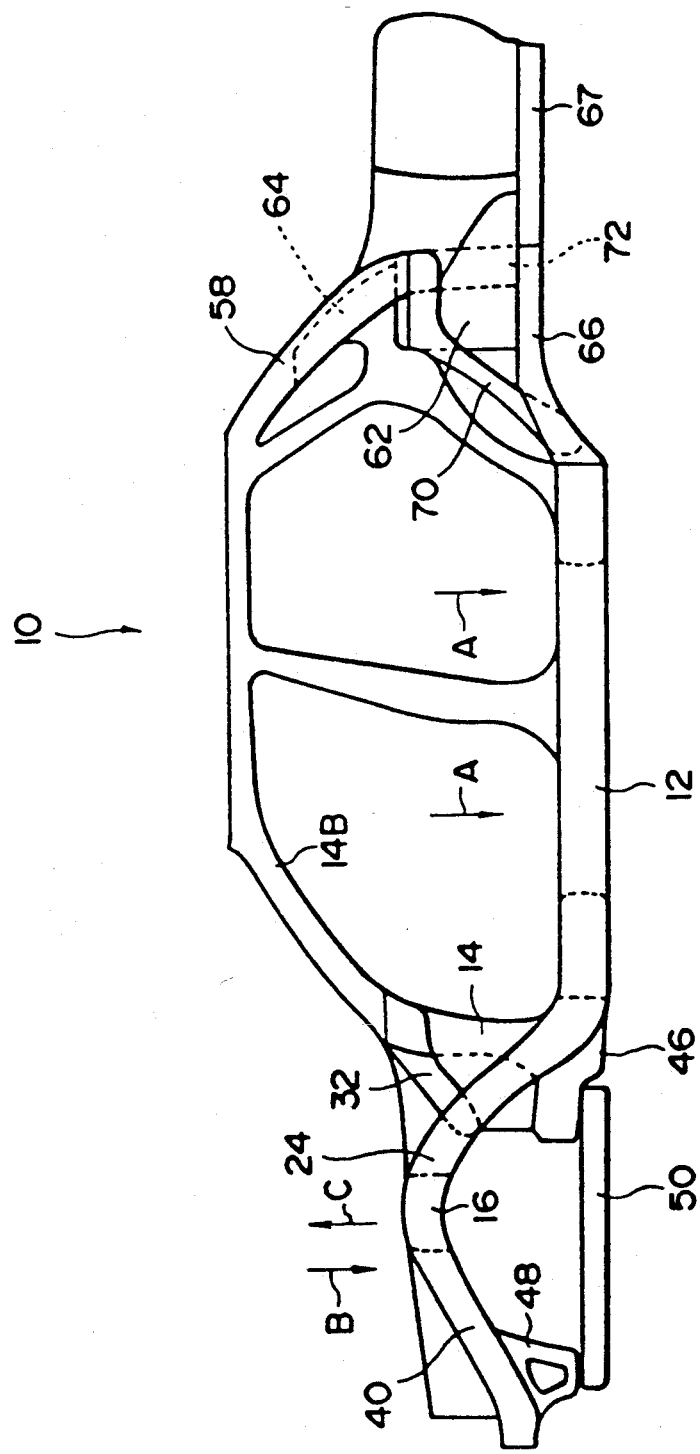
FIG. 2 is a side view of the framing structure in FIG. 1.

A first embodiment of the present invention is now described with reference to FIGS. 1 to 12. As shown in FIGS. 1 and 2, the lower portion of a vehicle 10 is provided with side sills 12 each of which is disposed in the longitudinal direction of the vehicle.

Figure 3:
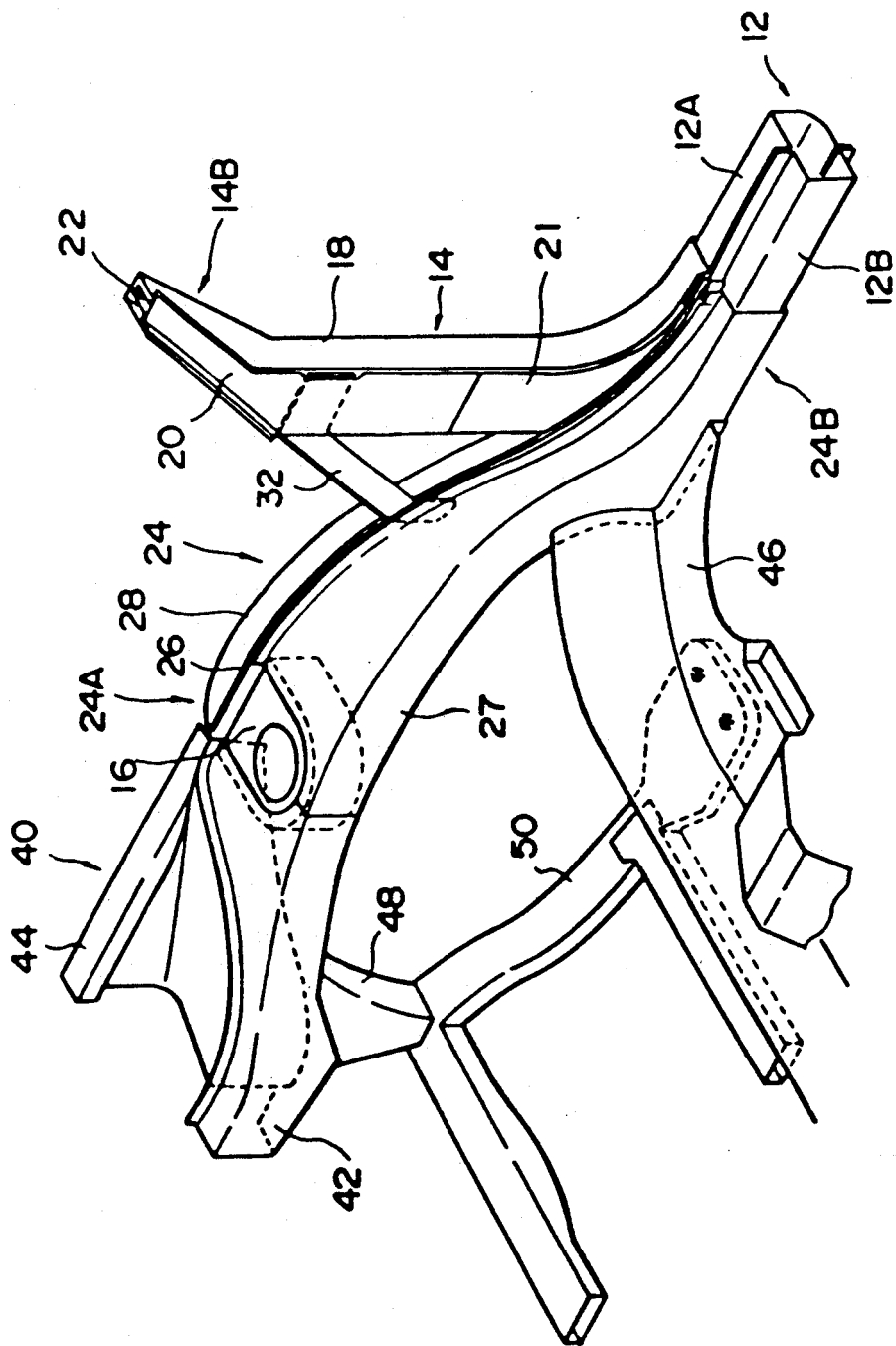
FIG. 3 is a schematic perspective view of the front end portion of the framing structure of a vehicle according to the first embodiment of the present invention.
Figure 4:
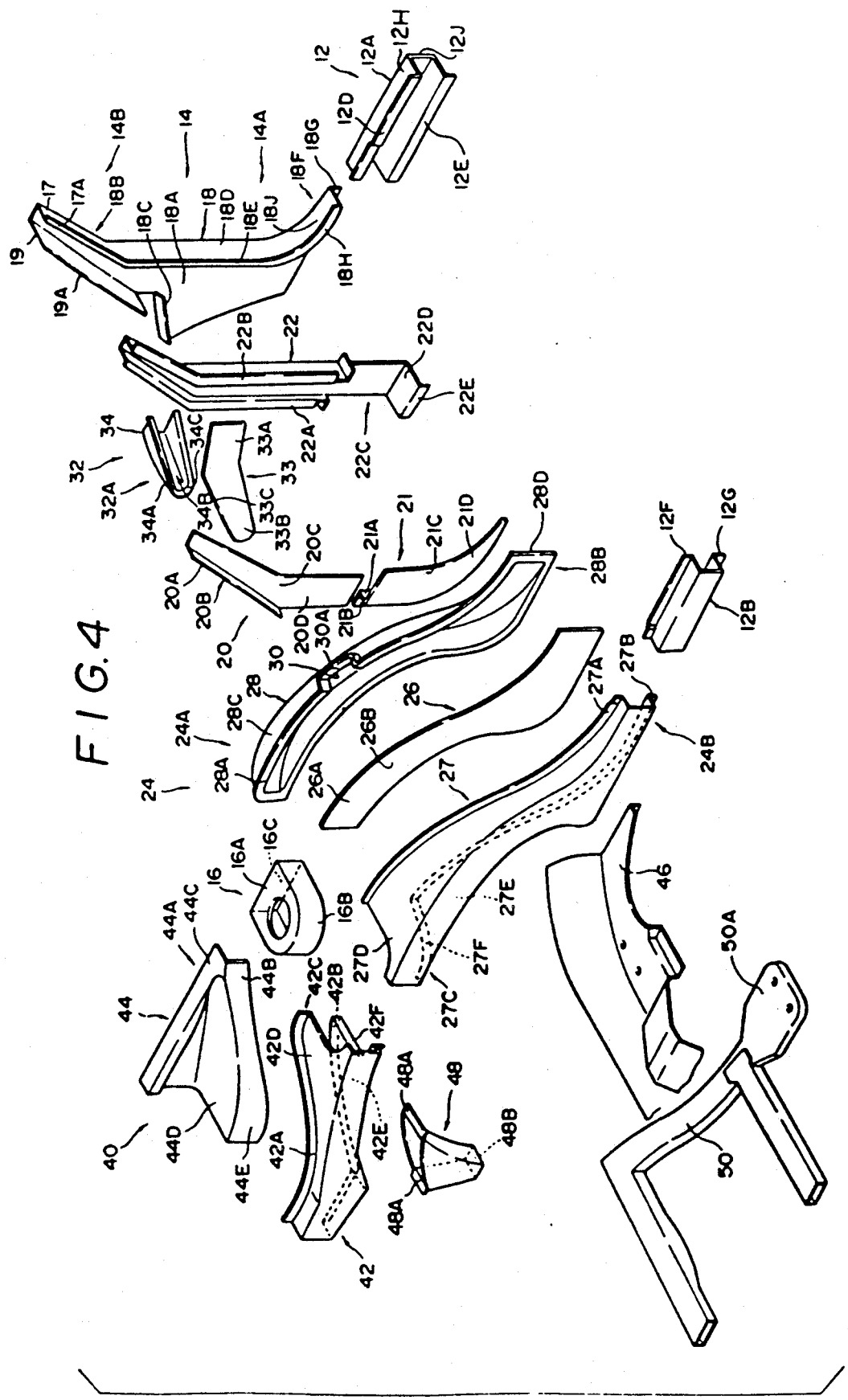
FIG. 4 is an exploded perspective view of FIG. 3.

As shown in FIGS. 3 and 4, side sill 12 is constituted by a sill outer piece 12A and a sill inner piece 12B. The sill outer piece 12A has a substantially U-shaped cross section and is arranged in such a manner that an upper vertical flange 12D and a lower vertical flange 12E project from the sill outer piece 12A so as to form a top hat-like shape whose open side faces sideward inwards toward the longitudinal center axis of the vehicle.

Sill inner piece 12B is disposed along the sill outer piece 12A in a position closer to the longitudinal center axis of the vehicle. Sill inner piece has a substantially U-shaped cross section, and is arranged in such a manner that an upper vertical flange 12F and a lower vertical flange 12G project from the sill inner piece 12B so as to form a top hat-like shape having its open side facing sideward and outward away from the longitudinal center axis of the vehicle. The upper vertical flange 12F and the lower vertical flange 12G are welded to the upper vertical flange 12D and the lower vertical flange 12E respectively of the sill outer piece 12A from the inner side, (i.e., the side closer to the longitudinal center of the vehicle).

At the front end portion of the sill 12, a front pillar 14 stands erect. The front pillar 14 comprises a front pillar outer piece 18, a front pillar inner piece 20, a front pillar lower inner piece 21, and a front pillar reinforcing piece 22.

The front pillar outer piece 18 has a base 18A formed in a triangular shape projecting forward. A slanted extension 18B arranged to extend upwards and toward the rear of the vehicle is formed at the top end portion of the base 18A. The slanted extension 18B supports either of two sides of a windshield in which lies across the front of the vehicle.

A section of the upper front portion of the base 18A (which is also an extension portion of the slanted extension 18B) is bent inwards at a right angle with respect to the longitudinal center of the vehicle, this upper front bent over portion thus forming a flange 18C. The rear edge portion of the base 18A is also bent inwards at a right angle, this rear bent over portion thus forming a flange 18D. Then in turn, the edge portion of the thus formed flange 18D is bent at a right angle towards the rear direction of the vehicle, this bent-over edge thus forming a flange 18E.

Likewise, the rear and front portions of slanted portion 18B are bent over to form rear and front flanges 17 and 19, respectively, so that the cross-section of the slanted extension 18B of the front pillar piece 18 is substantially in the form of a U-shape whose open portion faces inwards towards the longitudinal center axis of the vehicle. The edge of a rear portion 17 of a leg of the slant portion 18B is bent rearwards at a right angle, this edge piece thus forming a flange 17A. In contrast, the edge of the front flange 19 of the leg of the slanted extension 18B is not bent over, but extends inwards, the edge portion forming a flange continuous with front flange 19A.

The lower end portion of the base 18A of the front pillar piece 18 extends in the rear direction of the vehicle, the lower end portion thus being a projection 18F. The upper edge of the projection 18F is bent over to form a horizontal flange 18J. This horizontal flange 18J is welded to an upper surface 12H of the sill outer piece 12A from above. Horizontal flange 18J meets the base portion of projection 18F at a right angle, the base portion thus forming a vertical flange 18G. The thus formed vertical flange 18G is welded to an outer side surface 12J of the sill outer piece 12A from the outer side (the side farther from the longitudinal center axis of the vehicle).

The inner edge of the horizontal flange 18J of projection 18F is bent upwards at a right angle, the inner edge thus forming a vertical flange 18H. The thus formed vertical flange 18H is welded to the vertical flange 12D of the sill outer piece 12A from the outer side (the side away form the longitudinal center axis of the vehicle).

The front pillar inner piece 20 is in the form of a plate member whose lower portion is arranged in parallel with the vertical axis of the vehicle, the upper portion of the front pillar inner piece 20 being a slanted extension 20B arranged along the slanted extension 18B of the front pillar outer piece 18. The slanted extension 20B is arranged to have an L-shaped horizontal cross section, and a flange 20A is formed therefrom by bending the front edge toward the inside of the vehicle. The thus formed flange 20A is welded to the flange portion 19A of the front pillar outer piece 18.

The rear edge of a base 20C of the front pillar inner piece 20 is welded to the flange 17A of the front outer piece 18 from the inner side (the side closer to the longitudinal center axis of the vehicle). Therefore, a slanted portion 14B of the front pillar 14 is formed, having an enclosed cross section shape.

The front pillar lower inner piece 21 is vertically disposed below the front pillar inner piece 20. The front pillar lower inner piece 21 has an L-shaped horizontal cross-section, its front portion being bent outward away from the longitudinal center axis of the vehicle at a right angle, the front portion thus forming a flange 21A. In turn, the edge of the flange 21A is bent forward at a right angle, the edge thus forming a flange 21B. The thus formed flange 21B is welded to the central portion of the base 18A of the front pillar outer piece 18 from the inner side (the side closer to the longitudinal center axis of the vehicle).

A rear directed edge 21C of the front pillar lower inner piece 21 is welded to the flange 18E of the front pillar outer piece 18, thus forming the rear portion of a base portion 14A of the front pillar 14, having an enclosed vertical cross-section and comprised of the front pillar outer piece 18 and the front pillar lower inner piece 21.

The front pillar reinforcing piece 22 is disposed between the front pillar outer piece 18 and the front pillar inner piece 20 and between the front pillar outer piece 18 and the front pillar lower inner piece 21 with its rear directly lying along the rear portion 17 of the leg of the front pillar outer piece 18 and the flange portion 18D. The front pillar reinforcing piece 22 has a U-shaped horizontal cross-section with its open side facing inward, and a front vertical flange 22A and a rear vertical flange 22B project, from the edge of the U-shaped main body, the front pillar reinforcing piece 22 thus being in the form of a top hat-like shape whose open portion faces sideward and inward (towards the longitudinal center axis of the vehicle).

The front vertical flange 22A and the rear vertical flange 22B are welded to the front pillar inner piece 20 and the front pillar lower inner piece 21, respectively, from the outer side.

A lower section 22C of the front pillar reinforcing piece 22 is arranged to have a flat horizontal cross-section and the front pillar reinforcing piece 22 has a U-shaped horizontal cross-section whose open portion faces inward (towards the longitudinal center of the vehicle). The lower end of reinforcing piece 22 is bent inward thus forming flange 22D, and at a right angle, the inner edge of flange 22 is bent downward at a right angle thus forming a flange 22E which is welded to the front end portion of the vertical flange 12E of the sill outer piece 12A from the inner side, the side closer to the longitudinal center axis of the vehicle.

A rear end section 24B of a front strut member 24 serving as a side member having a straight axis when viewed in a plan view is welded to a portion which couples the side sill 12 to the front pillar 14. A front end section 24A of the front strut member 24 is coupled to a front spring support 16 disposed away from the front pillar 14 in the forward direction of the vehicle by a certain distance.

The front spring support 16 is arranged so as to have a D-shaped horizontal cross-section with its rounded side extending inwards toward the longitudinal center axis of the vehicle, and so as to have its axis parallel to the vertical axis of the vehicle.

The front strut member 24 is constituted by a front strut member reinforcer 26, a front strut member inner piece 27, and a front strut member outer piece 28.

The front strut member reinforcer 26 is a plate member whose central portion is shaped like an arc, curving downward toward the rear of the vehicle. An upper end portion 26A of the front strut member reinforcer 26 is welded to an outer vertical surface 16C of the front spring support 16.

The front strut member inner piece 27 is disposed, along the front strut member reinforcer 26, on the inside of the front strut member reinforcer 26 the side closer to the longitudinal axis of the vehicle. The vertical cross-section of the front strut member 27 taken perpendicular to its longitudinal axis is arranged so as to have an upper vertical flange 27A and a lower vertical flange 27B projecting from a cross-sectionally U-shaped body. As a result, the front strut member inner piece 27 is arranged to be in the form of a hat-like shape whose open portion faces sideward and outward (away from the longitudinal center axis of the vehicle). The upper vertical flange 27A and the lower vertical flange 27B are welded to a peripheral portion 26B of the front strut member reinforcer 26.

The front end portion of the front strut member inner piece 27 extends horizontally sidewards and inwards toward the longitudinal center axis of the vehicle along the curved outer surface of the front spring support 16 so as to form an extension 27C. An upper surface 27D of the extension 27C is welded to the rear half of the peripheral edge of upper surface 16A of the front spring support 16 from the upper side.

The edge of the front end of a lower surface 27E of the extension 27C is bent downwards at a right angle so as to be a flange 27F. The flange 27F is welded to the rear half of an outer surface 16B of the front spring support 16 from the inner side (the side closer to the longitudinal center axis of the vehicle).

That is, the extension 27C is arranged to hold the rear half of the front spring support 16.

The front strut member outer piece 28 is disposed on the outside of the front strut member reinforcer 26 along the front strut member reinforcer 26.

The front strut member outer piece 28 has a U-shaped cross-section (taken at a right angle to its longitudinal direction) facing sideward and inward from which a flange 28A projects vertically upwards and downwards from the upper and lower edges, respectively. The flange portion 28A also projects forward and rearwards from the front and rear end portions, respectively, of the front strut member outer piece 28. The flange portion 28A is welded to the peripheral section 26B of the front strut member reinforcer 26 longitudinal center axis of the vehicle.

The depth of the sideward and inward U-shaped cross-section of a rear end portion 28B of the front strut member outer piece 28 is arranged to gradually decrease across its width flange 22E of the front pillar reinforcer 22 is welded to an outer side surface 28D of the front strut member outer piece 28 from the outer side. An upper portion of the flange 28A as the rear end of the front strut member outer piece 28 is welded to the upper vertical flange portion 12D of the sill outer piece 12A from the inner side. A lower of the flange portion 28A at the rear end of the front strut member outer piece 28 is welded to the lower vertical flange portion 12E of the sill outer piece 12A from the inner longitudinal center axis of the vehicle.

A cowl side reinforcer 32 is disposed on a downward extension of the slanted extension 14B of the front pillar 14.

The cowl side reinforcer 32 comprises plate member 33 and a projection member 34. The plate member 33 has a rear section 33A arranged to have a large width so as to be welded to a lower portion 20D of the front pillar inner piece 20 from the outer side. The plate member 33 has a front section 33B arranged to have a small width and a tapered shape, becoming narrower toward its front end, and this front section 33B has an upper side 33C which is arranged to be a slanted side whose front portion is inclined downwards.

The projection member 34 has a U-shaped cross-section (taken at a right angle to its longitudinal center) having an open portion 34B facing sideward and inward (toward the longitudinal center axis) of the vehicle. The depth of the U-shaped cross section shape of a front section 34A of the projection member 34 gradually decreases toward its downward end. A vertical flange portion 34C is formed along the peripheral rim of the open portion 34B by bending the rim over at a right angle, the vertical flange portion 34C being welded to the plate member 33 from the outer side (the side away from the longitudinal center axis) of the vehicle.

On a rear end of an upper surface 28C in the central portion of the front strut member outer piece 28 there is provided a cut out recess 30 in the form of a U-shape facing sideward and inward. A front end section 32A of the cowl side reinforcer 32 is inserted into the cut out 30. Furthermore, the cut recess 30 has a peripheral portion in at which a flange portion 30A is formed so as to be continuous with the flange portion 28A, the flange portion 30A being welded to the projection member 34 of the cowl side reinforcer 32. The front section 33B of the plate member 33 of the cowl side reinforcer 32 is welded to the front strut member reinforcer 26.

A front side member 40 is coupled to the front portion of the front spring support 16, parallel to the longitudinal axis of the vehicle. The front side member 40 comprises a front side member inner piece 42 and an apron 44. The vertical cross-section of a rear end portion 44A of the apron 44B is arranged to be in the form of an L-shape having a vertical member 44 formed on the inner sides (the side closer to the longitudinal center axis) of the vehicle; a horizontal member 44C formed on the upper side. The vertical member 44B is welded to the outer surface 16C of the front spring support 16 from the outer side (the side away from the longitudinal center axis) of the vehicle. The apron 44 has an extension 44D which extends sidewards and (towards the longitudinal inward center axis of the vehicle and which slopes downwards toward the front end. An inner end portion side edge of the extension 44D is bent downwards at a right angle, thus forming a vertical flange portion 44E which is continuous with the vertical member 44B.

The front side member inner piece 42 is disposed on the inside of the extension 44D of the apron 44. The longitudinal cross-section of the front side member inner piece 42 is arranged to be in the form of a top hat-like shape in which an upper vertical flange 42A and a lower vertical flange 42B project from the respective upper and lower rims of a U-shaped main portion whose and open side faces outward and sideward (away from the longitudinal center axis of the vehicle). The thus formed upper vertical flange 42A and the lower vertical flange are welded to the vertical flange portion 44E of the apron 44 from the inner side so as to form a closed cross-section.

A rear end portion of the front side member inner piece 42 is arranged to be a wide extension 42C which extends sidewards and outward from its longitudinal axis, away from the longitudinal center axis of the vehicle. A peripheral portion of an upper surface 42D of the front side member 42 is welded to a peripheral portion of the upper surface 16A of the front spring support 16 from the upper side.

A rear end portion of the lower surface 42E of the wide extension 42C is bent vertically downwards at a right angle, thus forming a lower vertical flange 42F which is welded to the front spring support 16 (via the two welded connections just mentioned).

That is, the wide sections 42C is arranged so as to hold the front half portion of the front spring support 16.

The rear end portion 24B of the front strut members 42 disposed on either side of the vehicle direction of the vehicle are connected to each other by floor cross members 46 disposed on the underside transverse direction of the vehicle. A brace 48 is disposed in the of the front end of the front side member inner piece 42. An upper horizontal flange portion 48A formed at an upper rear end edge of the brace 48 is welded to the lower surface 42E of the front side member inner piece 42.

A lower end section 48B of the brace 48 vertical direction of the vehicle is arranged to be in the form of a rectangular shape so as to serve as a member for forming a closed cross-section, the lower end portion 48B being coupled to a sub-frame 50 horizontally disposed in a lower portion of the front body of the vehicle. A rear portion 50A of the sub-frame 50 is coupled to the floor cross member 46.

Now, the structure of the rear portion of the body of a vehicle is described.

Figure 5:
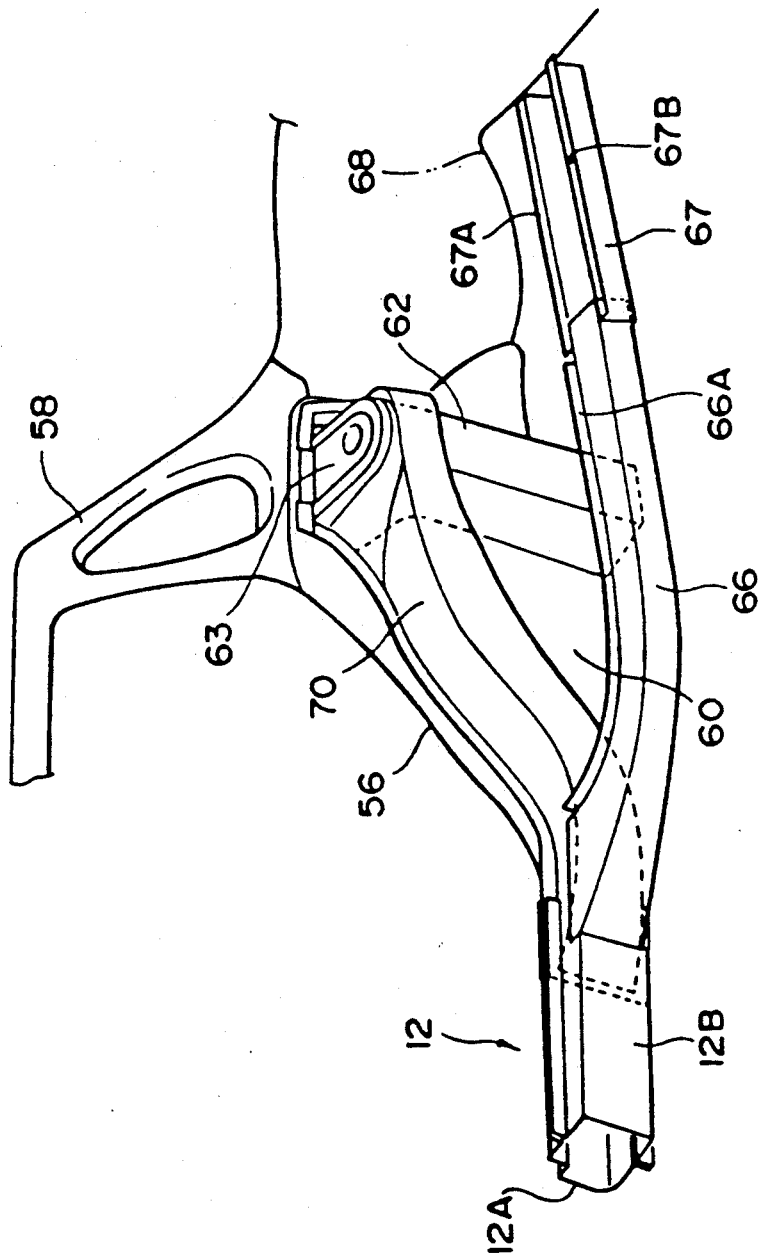
FIG. 5 is a schematic perspective view which illustrates the rear portion of the framing structure when viewed from the front side of the vehicle according to the first embodiment of the present invention.
Figure 6:
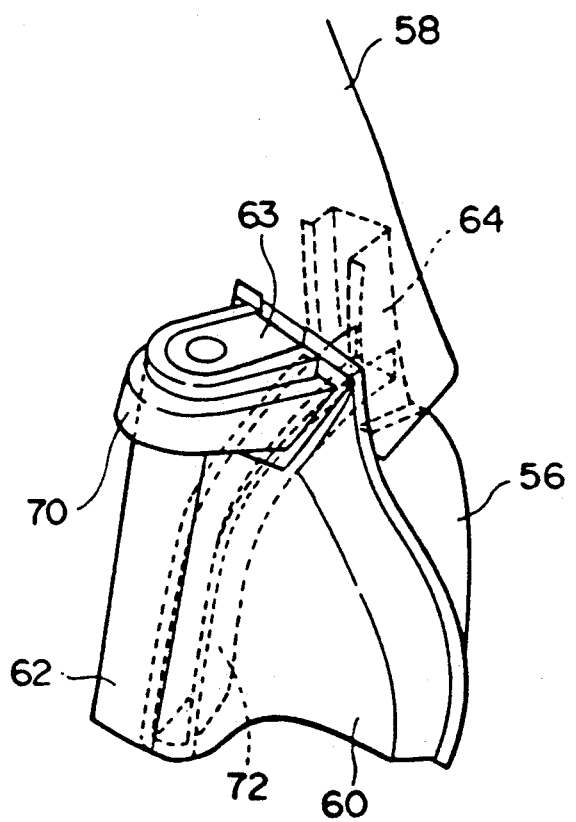
FIG. 6 is a schematic perspective view which illustrates the rear portion of the framing structure when viewed from the rear side of the vehicle according to the first embodiment of the present invention.
Figure 7:
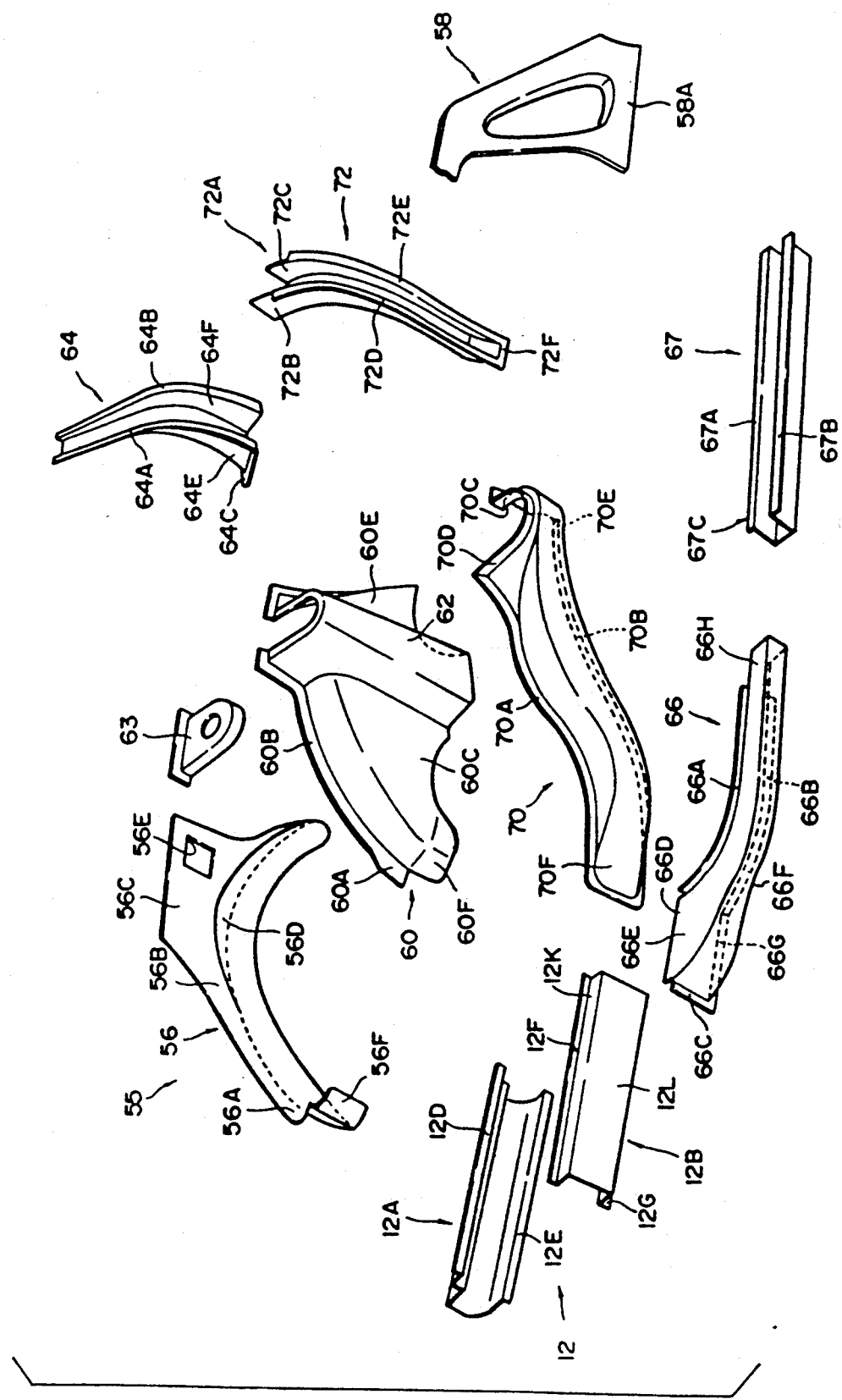
FIG. 7 is an exploded perspective view of FIG. 5 with parts added from FIG. 6.
Figure 8:
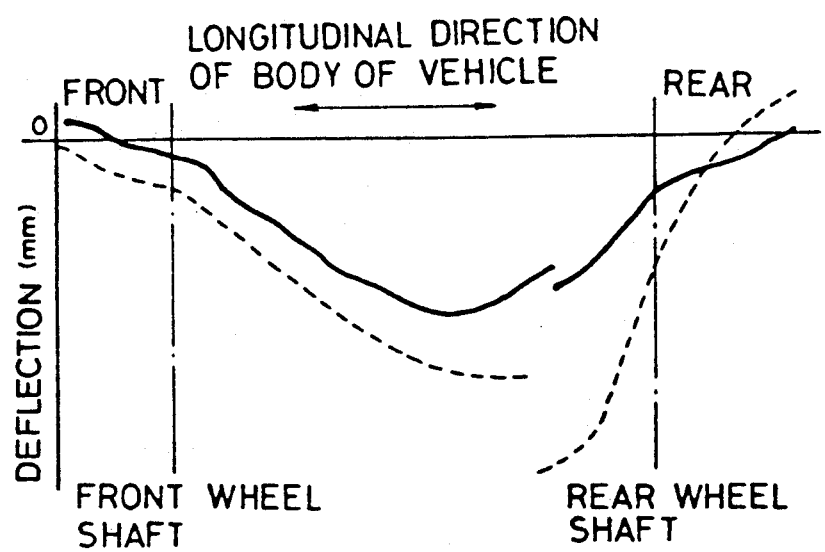
FIG. 8 is a graph which illustrates the relationship between the body of a vehicle and the deflection.
Figure 9:
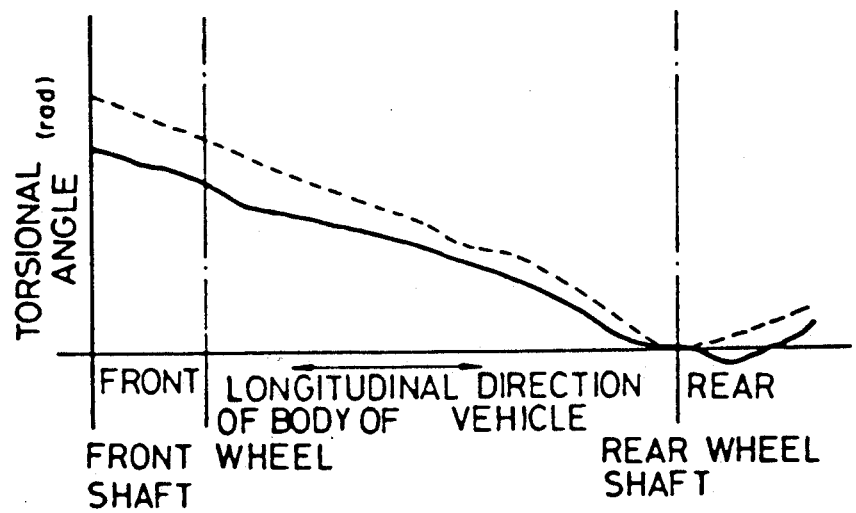
FIG. 9 is a graph which illustrates the relationship between the body of a vehicle and the torsion.
Figure 11:
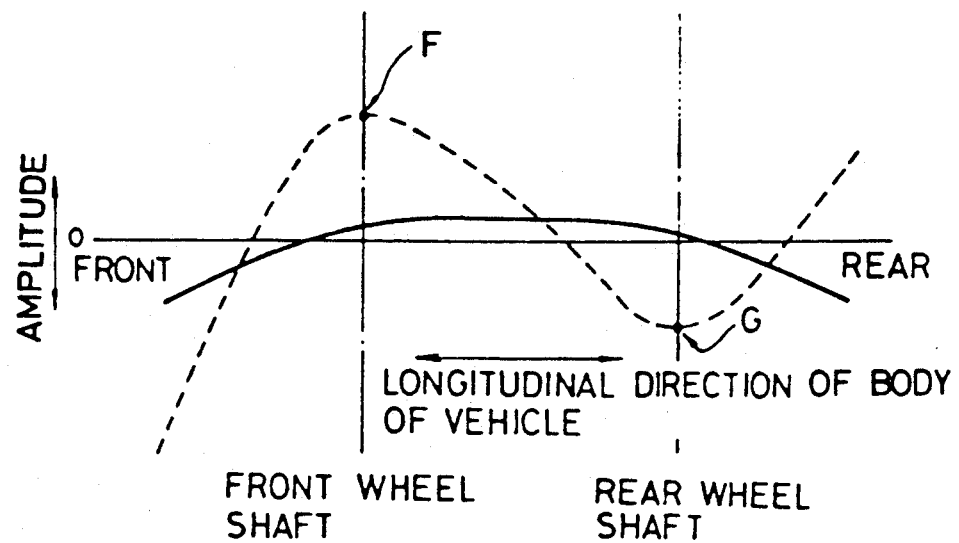
FIG. 11 is a graph which illustrates the relationship between the body of a vehicle and the amplitude.
Figure 12:
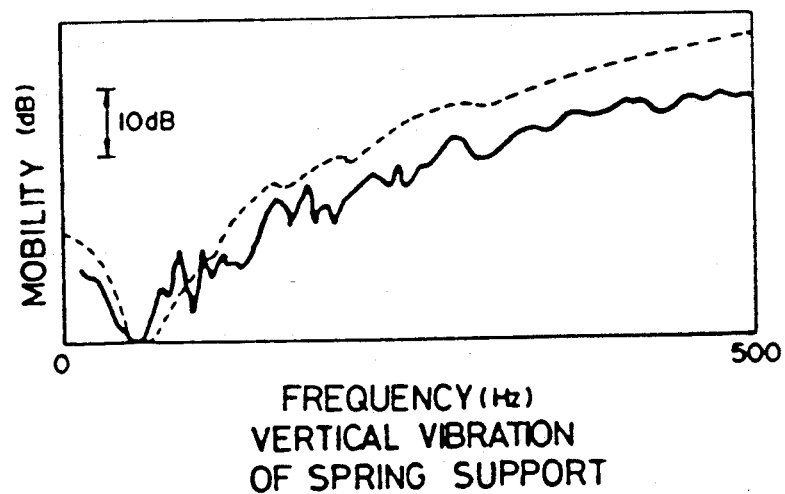
FIG. 12 is a graph which illustrates the frequency and the mobility when the spring support is vibrated vertically.

As shown in FIGS. 5 to 7, a rear wheel house outer member 56 forming a portion of a rear wheel house (not shown) is disposed in a rear portion of the side sill 12 parallel with the longitudinal axis of the vehicle.

A vertical flange portion 56A extending forward the from the rear wheel house outer member 56 is welded at its inward facing surface to the rear end of the upper vertical flange 12D of the sill outer piece 12A from the outer side (the side away from the longitudinal center axis of the vehicle).

A rear wheel house inner member 60 forming another portion of the rear wheel house 55 is disposed on the inside of the rear wheel house outer member 56. A vertical flange portion 60A extending forward from the rear wheel house inner member 60 is welded at its outward facing surface to the rear end portion of the upper vertical flange 12F of the sill inner piece 12B from the inner side.

The front end portion of the rear wheel house inner member 60 projects downwards so as to form a projection 60F. A vertical flange portion 56F projecting inwardly at the front end of the rear wheel house outer member 56 is welded to the projection 60F from the front end.

A vertical flange portion 60B is formed so as to be continuous with the vertical flange portion 60A at a peripheral edge of the upper section of the rear wheel house inner member 60. The vertical flange portion 60B is welded to a vertical flange portion 56B formed so as to be continuous with a vertical flange portion 56A at a peripheral edge of the upper section of the rear wheel house outer member 56, the welding being conducted from the inner side.

A vertically elongated protrusion at the central portion of the rear wheel house inner member 60 extends inwards so as to form a rear spring support member 62. A rear spring support 63 is welded to the upper end of the rear spring support member 62.

A front rear-floor side member 66 is disposed on the inside of the side sill 12 and the rear wheel house 55. The perpendicular cross-section of the front end portion of the front rear-floor side member 66 is arranged to be in the form of a U-shape having its open portion facing sideward and outwards. An end section 66D at the outward facing end of an upper surface 66E of the front rear-floor side member 66 is welded to an upper surface 12K of the sill inner piece 12B. The outer edge of a lower surface 66F is bent downwards at a right angle so as to form a flange portion 66G which is welded to an inner surface of the sill inner piece 12B in the transverse direction of the vehicle.

The front end of the front rear-floor side member 66 has a vertical flange portion 66C formed by bending the front edge forwards at a right angle. The vertical flange portion 66C is welded to the inner surface 12L of the sill inner piece 12B.

The vertical cross-sections of the central portion of the front rear-floor side member 66 and the rear end portion of the same are arranged so as to form a top hat-like shape in which an upper vertical flange portion 66A and a lower vertical flange portion 66B project from the edges of the U-shaped main body of the front rear-floor side member 66, the hat-like shaped portion having its open side facing sidewards and outwards.

The upper vertical flange 66A and the lower vertical flange 66B of the front rear-floor side member 66 are both welded to the rear spring support 62 from the inner side.

A front end section 67C of a rear-floor side member 67 is welded to a rear end section 66H of the front rear-floor side member 66 from the lower side. The vertical cross-section of the rear-floor side member 67 has a top hat-like shape having its open side facing upwards and has an outer horizontal flange 67A and an inner horizontal flange 67B which project horizontally from the edges of its U-shaped main body, the top hat-like shape having its open portion facing upwards.

The outer horizontal flange 67A and the inner horizontal flange 67B are both welded to a rear floor pan 68.

A rear side member reinforcer 70 arranged to have a straight axis when viewed in a plan view and to act as a side member is disposed at the rear end of the sill inner piece 12B. The vertical cross-sectional shapes of the front and central portions of the rear side member reinforcer 70 are top hat-like. An upper vertical flange portion 70A and a lower vertical flange portion 70B project from the edges of its U-shaped main body, the top hat-like shape having its open side facing sidewards and outwards.

The depth of the top-hat shape of the rear side member reinforcer 70 decreases gradually towards its front end. The front end of the rear side member reinforcer 70 is inserted into the U-shaped main body of the sill inner piece 12B.

The upper vertical flange portion 70A of the rear side member reinforcer 70 is welded between the upper vertical flange 12D of the sill outer piece 12A and the upper vertical flange 12F of the sill inner piece 12B The lower vertical flange portion 70B of the rear side member reinforcer 70 is welded between the lower vertical flange 12E of the sill outer piece 12A and the lower vertical flange 12G of the sill inner piece 12B.

The upper vertical flange 66A and the lower vertical flange 66B in the central portion of the front end rear-floor side member 66 are welded to the front portion of the inward-facing surface 70F of the rear side member reinforcer 70, the welding being conducted from the inner side.

The upper vertical flange portion 70A and the lower vertical flange portion 70B in the central portion of the rear side member reinforcer 70 are welded to an inward-facing surface of the rear wheel house inner member 60 from the inner side.

A cut portion 70C cut so as to hold the upper portion of the rear spring support member 62 is formed in a rear end portion of the rear side-member reinforcer 70. An upper vertical flange portion 70D is formed by bending the upper rim edge of the cut portion 70C upwards. The upper vertical flange portion 70D is welded to the upper portion of the rear spring support member 62.

A lower vertical flange portion 70E is formed by bending the lower rim edge of the cut portion 70C downwards. The lower vertical flange portion 70E is welded to the upper portion of the rear spring support member 62.

A rear pillar 58 is disposed vertically above the rear wheel house outer member 56. A lower end section 58A of the rear pillar 58 is welded to an upper end section 56C of the rear wheel house outer member 56 from the outer side.

A rear pillar reinforcer 64 is disposed on the outside of the rear pillar 58 along the rear vertical member of the rear pillar 58. The horizontal cross-section of the rear pillar reinforcer 64 is in the form of a top hat-like shape in which a front vertical flange portion 64A and a rear vertical flange portion 64B project from the edges of its U-shaped main body, the top hat-like shape having its open side facing sidewards and inwards. The front vertical flange portion 64A and the rear vertical flange portion 64B are welded to the outer surface of the rear pillar 58.

A U-shaped flange portion 64C facing sideward and outward is formed at the lower end of the rear pillar reinforcer 64. The flange portion 64C is welded to an extension 56D formed in the rear wheel house outer member 56 and extending outwards (in the transverse direction of the vehicle) the welding being conducted from the upper side.

A wheel house reinforcer 72 is vertically disposed below the rear pillar reinforcer 64. The vertical cross-section of an upper end leg portion 72A of the wheel house reinforcer 72 is in the form of a U-shape having its open portion facing upwards. The upper end leg portion 72A penetrates, from the inner side (in the transverse direction of the vehicle) a through hole 56E formed in the upper section 56C of the rear wheel house outer member 56. A front side portion 72B of the upper end leg portion 72A is welded to a front side portion 64E of a lower end of the rear pillar reinforcer 64. A rear side portion 72C of the upper end leg portion 72A is welded to a rear portion 64F of the lower end of the rear pillar reinforcer 64.

The horizontal cross-sections of the central and lower portions of the wheel house reinforcer 72 are in the form of a top hat shape in which a front vertical flange portion 72D and a rear vertical flange portion 72E project from the edges of its U-shaped main body, the top hat-shaped portion having its open side facing sidewards and inwards. The front vertical flange portion 72D and the rear vertical flange portion 72E are welded to an inward-facing surface 60E of the rear portion of the wheel house inner member 60 from the outer side.

The depth of the U-shaped portion of the lower end portion of the wheel house reinforcer 72 decreases gradually toward the end. The lower end of the front vertical flange portion 72D and the lower end of the rear vertical flange portion 72E are continuous with a lower flange portion 72F. The flange portion 72F at the lower end is welded to the lower inward-facing surface 60E of the rear portion of the wheel house inner member 60 from the outer side.

Therefore, in the front body of the framing structure of a vehicle according to the first embodiment, the side sill 12 and the front spring support 16 are connected to each other by a structure having a straight configuration being comprised of the front strut member 24 and the front side member 40. Furthermore, a structure having no vertical offset with respect to the side sill 12 is formed by the sub-frame 50.

In the rear body, the side sill 12 and the rear spring support 62 are connected to each other by a structure having a straight axis when viewed in the plan view, the straight structure being comprised of the rear side-member reinforcer 70.

As a result, since the portions of the framing structure directly influenced by the torsional deformation deriving from both the front body and the rear body can be reduced, the rigidity in the connection between the main body and the front body and that between the main body and the rear body is improved.

Figure 20:
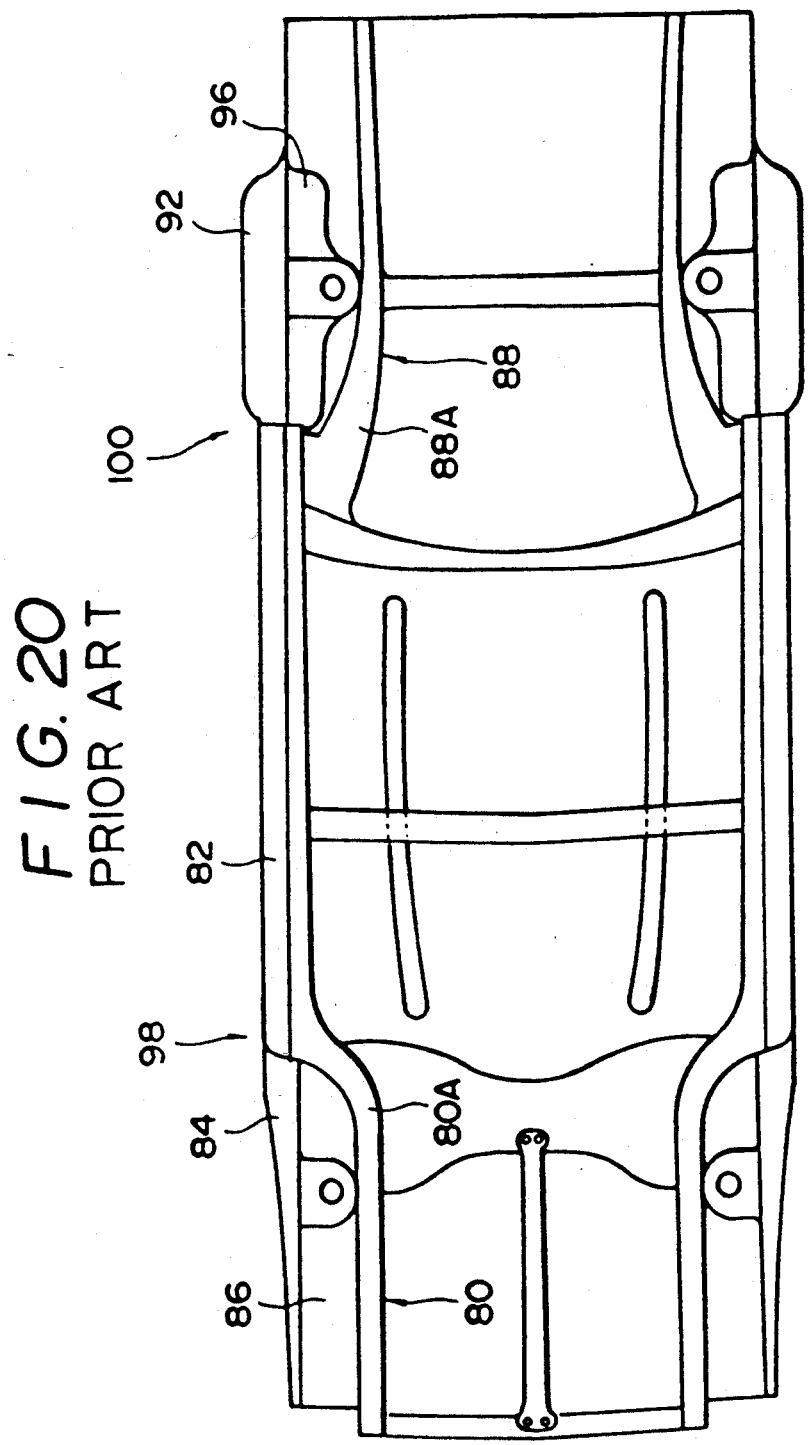
FIG. 20 is a schematic perspective plan view which illustrates a conventional framing structure of a vehicle.
Figure 21:
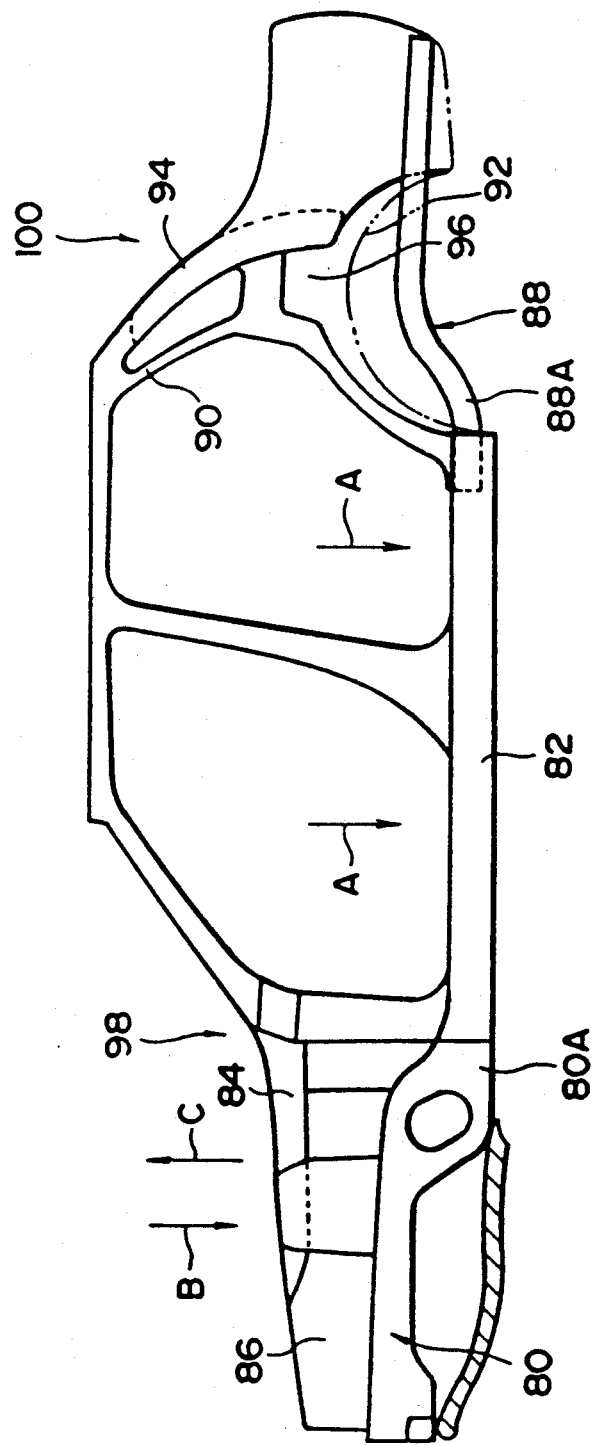
FIG. 21 is a schematic side view which illustrates the conventional framing structure of a vehicle.

As shown in FIGS. 20 and 21, according to conventional technology, an apron 86 connecting the front side member 80 and the apron upper member 84 is made of a panel member. As a result, deformation perpendicular to the apron 86 (i.e., in the transverse direction of the vehicle) can easily occur. That is, the rigidity of the whole front body of the frame is insufficient.

That is in contrast with the present invention in which, in the front body whose structure has been formed according to the first embodiment, the bending force which is received by the front strut member 24 is transferred as an axial force to the slanted portion 14B of the front pillar 14 as a result of the action of the cowl side reinforcer 32. As a result, the rigidity in the connection between the main body and the front body is improved.

In the rear body whose structure has been formed according to the first embodiment of this invention, the rear pillar reinforcer 64 and the wheel house reinforcer 72 are connected to the rear pillar 58, the rear wheel house outer member 56, and the rear wheel house inner member 60. Therefore, the rigidity in the connection between the main body and the rear under body is improved.

According to the conventional technology shown in FIGS. 20 and 21, a wheel house inner member 96 connecting a roof side member 94 and a rear floor side member 88 is made of a panel member. Therefore, deformation perpendicular to the wheel house inner member 96 (i.e., in the transverse direction of the vehicle) can easily take place. As a result, the overall rear body of the framing structure is insufficient.

In contrast with this aspect of the prior art in the rear body whose structure has been formed according to the first embodiment of the present invention, a triangular structure is formed in the vicinity of the rear spring support member 62 by the front rear-floor side member 66, the wheel house reinforcer 72 and the rear side member reinforcer 70. As a result, the rigidity in the connection of the rear body is further improved.

Therefore, when a load is in the downward direction designated by arrow A in FIGS. 2 and 21 is applied to the framing structure according to the first embodiment, the amount of deflection (designated by a continuous line in FIG. 8) of the structure of the vehicle according to the first embodiment is reduced in comparison to the amount of deflection (designated by a line of short dashes in FIG. 8) which takes place in the conventional structure shown in FIGS. 20 and 21.

When a load is applied in the vertical direction (the direction designated by arrows B and C in FIGS. 2 and 21) to the front body of the framing structure of a vehicle according to the first embodiment in the vertical direction, the angle of the deflection (designated by a continuous line shown in FIG. 9) which takes place in the structure of the body of a vehicle according to the first embodiment is reduced in comparison to the angle of deflection (designated by a line of short dashes in FIG. 9) which takes place in the conventional structure shown in FIGS. 20 and 21.

FIG. 10 is a graph of vertical rigidity versus lateral rigidity. The vertical rigidity (represented by symbol D1 in FIG. 10) of the front suspension when the central portion (the portion in the vicinity of the center pillar) of a vehicle according to the first embodiment is large in comparison to the vertical rigidity (represented by symbol D2 in FIG. 10) of the front suspension of the conventional structure shown in FIGS. 20 and 21. Furthermore, the lateral rigidity (represented by symbol E1 in FIG. 10) of the rear suspension when the portion in the vicinity of the center pillar of the framing structure of a vehicle according to the first embodiment is fixed is larger in comparison to the lateral rigidity (represented by symbol E2 in FIG. 10) of the rear suspension of the conventional structure shown in FIGS. 20 and 21.

According to the first embodiment, the vibration mode (designated by a continuous line in FIG. 11) at a frequency showing the lowest peak level cannot become the three-stage bending mode (designated by a line of short dashes in FIG. 11) of the conventional structure shown in FIGS. 20 and 21 in which a portion F in which the main body and the front body are connected to each other and a portion G in which the rear body and the main body are connected to each other deform excessively. Therefore, vibration of the framing structure which takes place at high speed driving is minimized.

The mobility (designated by a continuous line in FIG. 12) of the point of application of force in the framing structure of a vehicle according to the first embodiment can be reduced in comparison to the mobility (designated by a line of short dashes in FIG. 12) of the point of application of force in the conventional structure shown in FIGS. 20 and 21 except for the frequency range of approximately 50 Hz to 100 Hz.

Therefore, according to the framing structure of a vehicle according to the first embodiment, stable driving performance, vibration minimization performance during high speed driving and the noise reduction performance while driving on rough roads are all improved.

Now, a second embodiment of the present invention is described with reference to FIGS. 13 to 15.

The same elements as those according to the first embodiment are given the same reference numerals and descriptions are omitted.

Figure 13:
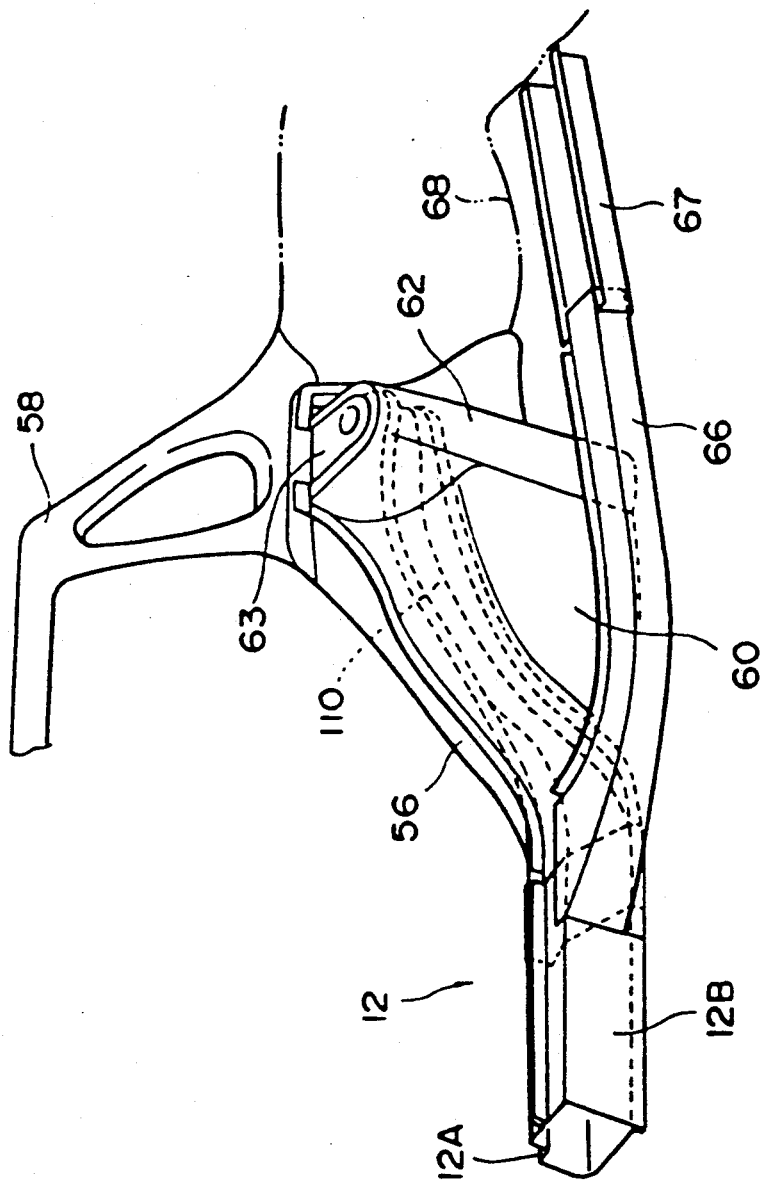
FIG. 13 is a schematic perspective view which illustrates the front portion of the framing structure when viewed from the front side of the vehicle to the second embodiment of the present invention.
Figure 14:
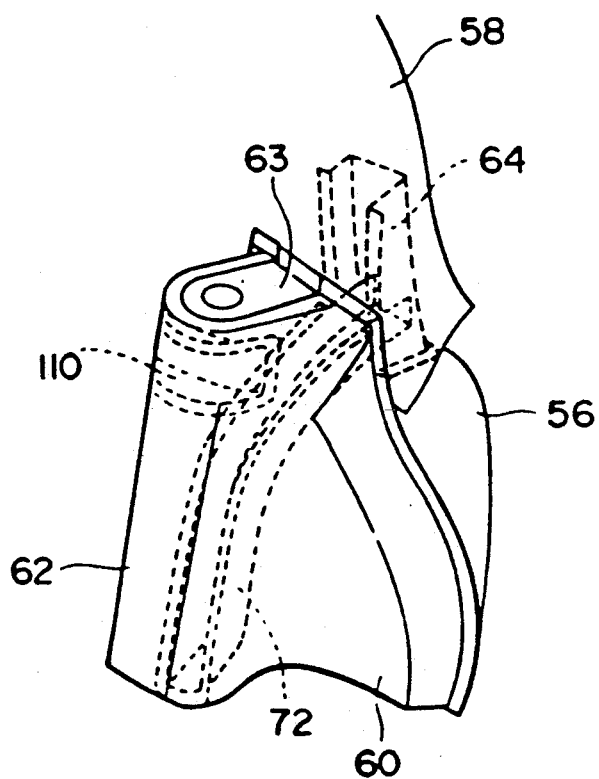
FIG. 14 is a schematic perspective view which illustrates the rear portion of the framing when viewed from the rear side of the vehicle according to the second embodiment of the present invention.
Figure 15:
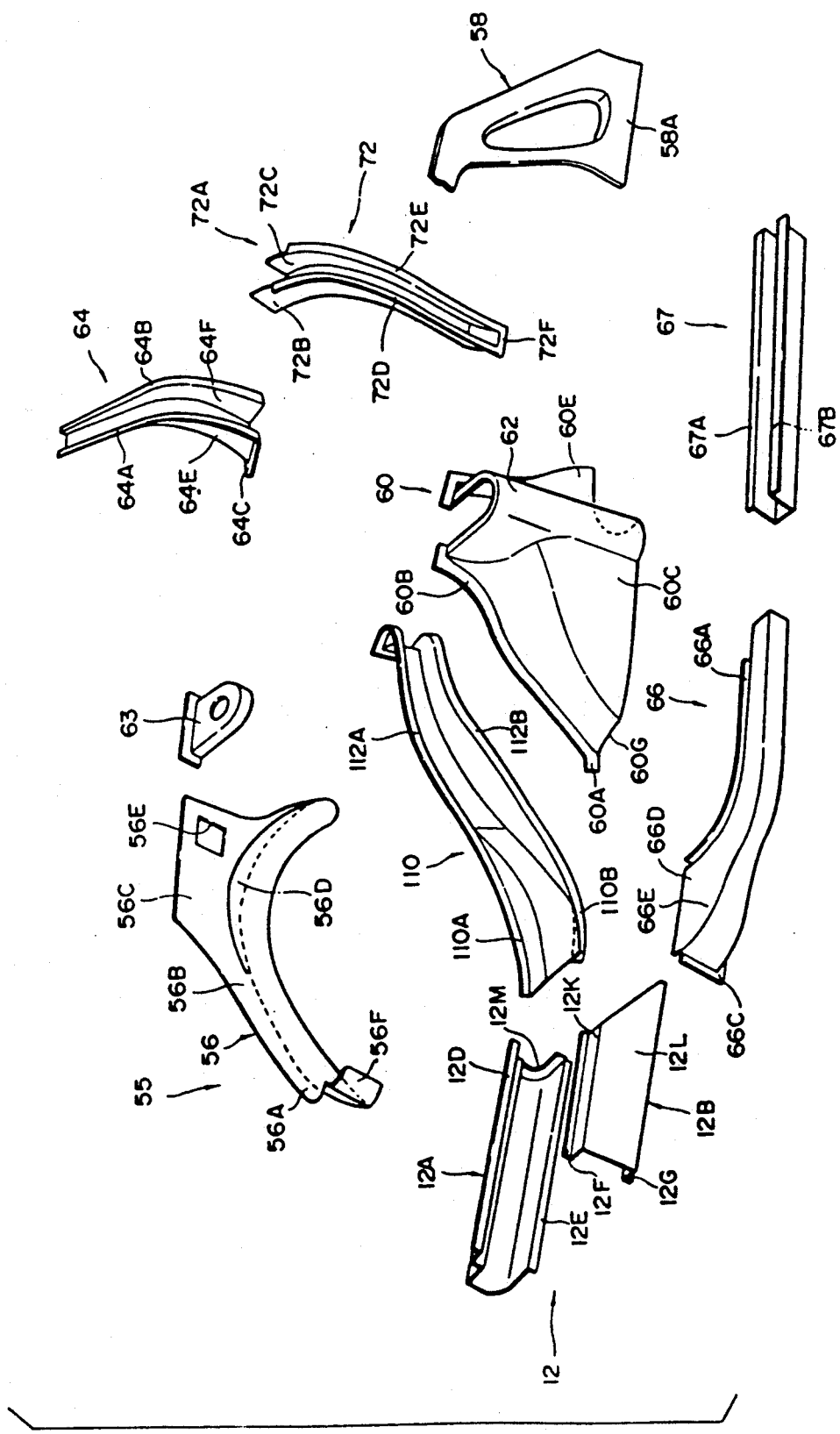
FIG. 15 is an exploded perspective view of FIG. 13 with parts added from FIG. 14.

As shown in FIGS. 13 to 15, the vertical cross-section of the front end portion of a rear side member reinforcer 110 is arranged to be in the form of a top hat in which an upper vertical flange portion 110A and a lower vertical flange portion 110B project from the edge of its U-shaped main body, the top hat-shape having its open side facing sidewards and outwards.

The rear side member reinforcer 110 has a substantially triangular shape, with the upper edge cut diagonally from a point on the upper portion of the front end to a point on the lower portion of the rear end. The thus cut diagonal edge of the front end portion is continuously disposed along the rear end portion of the sill inner piece 12B, in the longitudinal direction of the vehicle, the sill inner piece 12B being similarly cut. The upper vertical flange portion 110A is welded to the upper vertical flange portion 12D of the sill outer piece 12A from the inner side. The lower vertical flange portion 100B is welded to the lower vertical flange 12E of the sill outer piece 12A from the inner side.

A flange portion 12M projects inward from the rear edge of the sill outer piece 12A. The flange portion 12M is welded to a vertical flange portion 56F of the rear wheel house outer piece 56.

The central portion and the rear end of the rear side member reinforcer 110 are inwardly inserted into the rear wheel house inner member 60 from the lower side of the front end portion 60G of the rear wheel house inner member 60. The vertical cross-sections of the central and the rear end portion of the rear side member reinforcer 110 are of hat-like shape in which an upper vertical flange portion 112A and a lower vertical flange portion 112B project from the edges of its U-shaped main body facing sideward, the hat-like shape having its open side facing sidewards and inwards.

The upper vertical flange portion 112A and the lower vertical flange portion 112B are welded to an inward facing surface 60C of the front portion of the rear wheel house inner member 60 and to an inner surface at the upper end portion of the rear spring support member 62, respectively, from the outer side.

Therefore, also according to the second embodiment of the present invention, similarly to the first embodiment, the rigidity in the connection of the rear body is improved since a triangular structure is formed in the vicinity of the rear spring support member 62 by the front rear-side member 66, the wheel house reinforcer 72, and the rear side member reinforcer 110.

Figure 16:
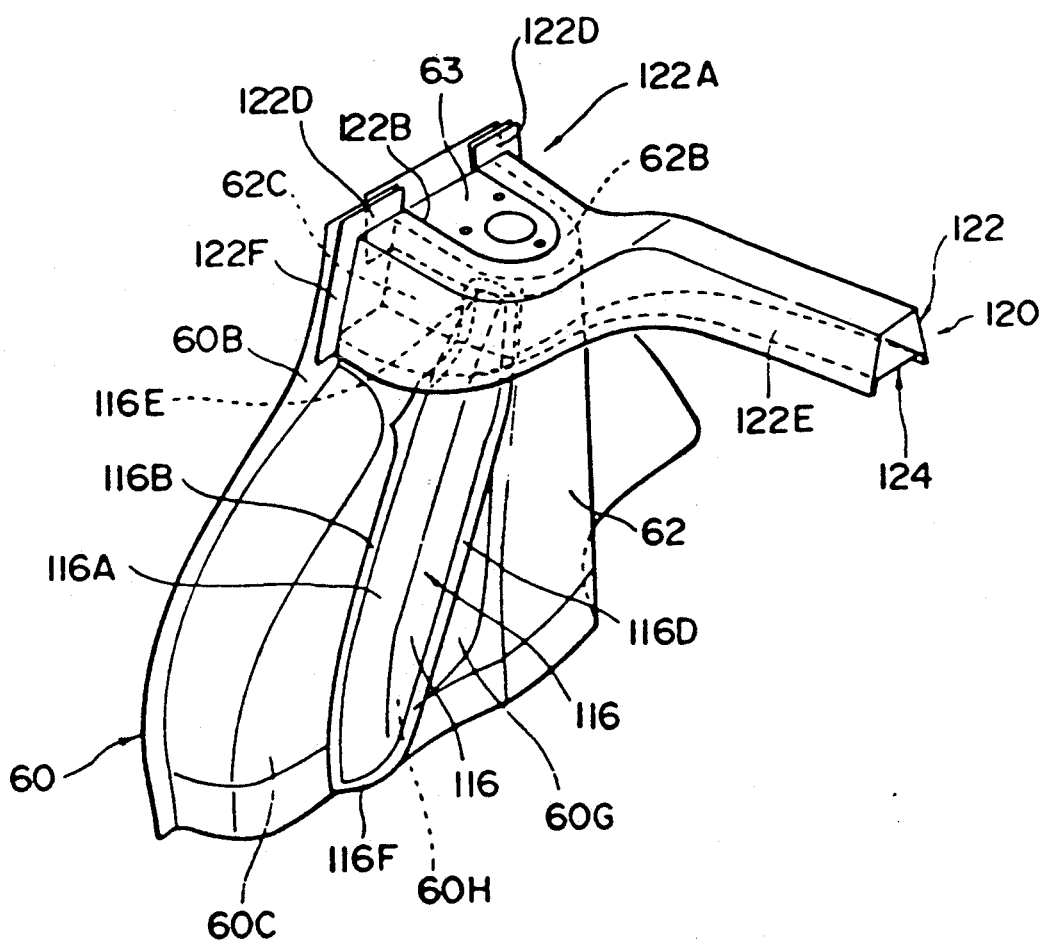
FIG. 16 is a schematic perspective view which illustrates a structure with improved rigidity in the connection in the rear suspension portion when viewed from the front end portion.
Figure 17:
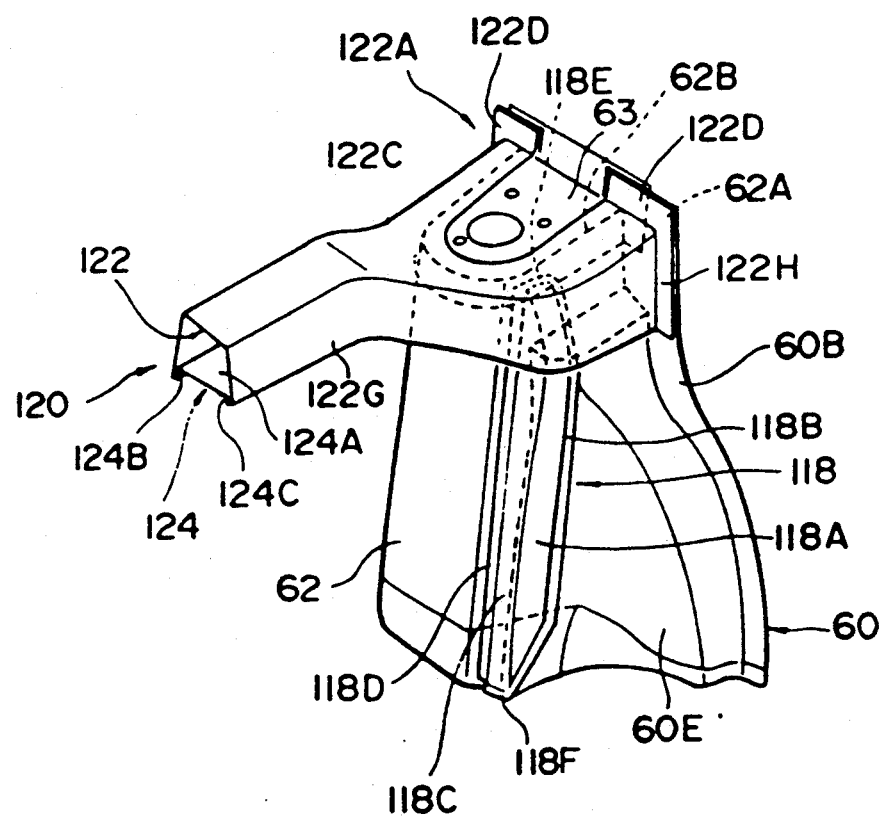
FIG. 17 is a schematic perspective view which illustrates a structure with improved rigidity in the connection in the rear suspension portion when viewed from the rear in the longitudinal direction of the vehicle.
Figure 18:
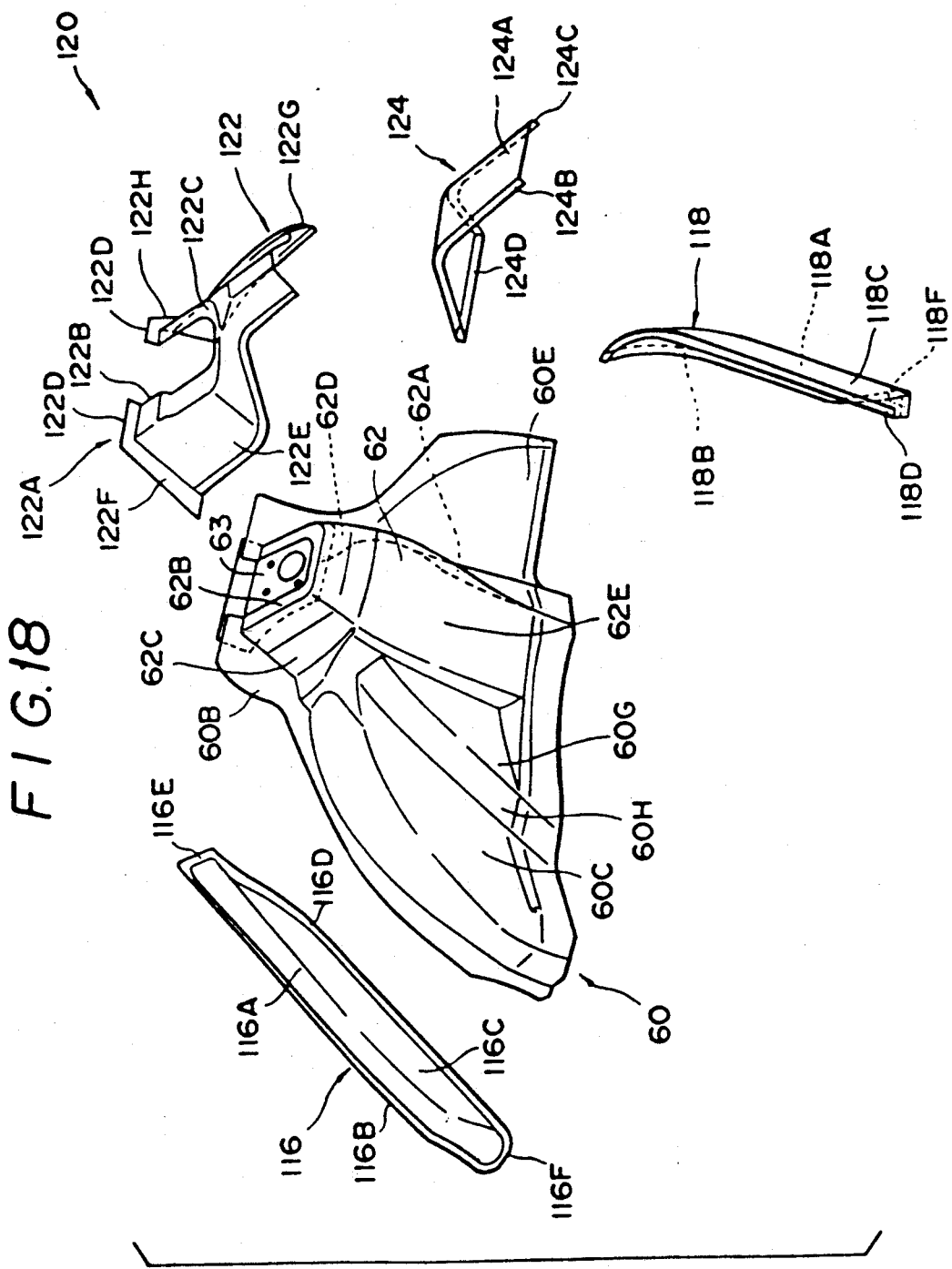
FIG. 18 is an exploded perspective view of FIG. 16.

According to the first and the second embodiments, side members having straight axes when viewed in the plan view are provided in both the portion at which the main body and the front body are connected to each other and the portion in which the main body and the rear body are connected to each other. As an alternative to the structure above, side members having straight axes when viewed in the plan view may be provided for either the portion at which the main body and the front body are connected to each other or the portion at which the main body and the rear body are connected to each other. For example, a structure may be employed in which side members having a straight axis when viewed in the plan view are provided for only the portion at which the main body and the front body are connected to each other and the structure of the rear portion of the body of the vehicle is arranged as follows:

That is, as shown in FIGS. 16 to 18, on each side of the vehicle a stepped portion 60G extending inward (in the transverse direction of the vehicle) from a portion in the vicinity of the upper end portion of the rear spring support member 62 is formed on an inward-facing surface 60C of the front portion of the rear wheel house inner member 60.

A front reinforcer 116 is welded to a portion in front of the stepped portion 60G along the stepped portion 60G. The cross section of the front reinforcer 116 taken perpendicularly to the longitudinal direction is arranged to be in the form of an L-shape. The outer end of a front surface 116A is bent forwards at a right angle. As a result, the thus bent portion forms a flange portion 116B. The flange portion 116B is welded to the inward-facing surface 60C of the rear wheel house inner member 60 from the inner side.

The rear end portion of the inner surface 116C of the front reinforcer 116 is bent inward at a right angle, the bent portion thus forming a flange portion 116D. The flange portion 116D is welded to a front surface 60H of the stepped portion 60G of the rear wheel house inner member 60.

The depth of the L-shaped portion of the upper end of the front reinforcer 116 is arranged to decrease gradually toward the end. Therefore, a flange portion 116E is formed continuous with flange portions 116B and 116D. The thus formed flange portion 116E is welded to a front surface of the rear spring support member 62.

The depth of the L-shaped portion at the lower end of the front reinforcer 116 is also arranged to decrease gradually towards the end. Therefore, a flange portion 116F is formed continuous with the flange portions 116B and 116D. The flange portion 116F is welded to the lower end of the front surface 60H of the rear wheel house inner 60.

A rear reinforcer 118 is welded to the rear end of the rear spring support member 62, the rear reinforcer being welded parallel with the vertical axis of the vehicle. The cross-section of the rear reinforcer 118 (taken perpendicular to the longitudinal direction) is arranged to be in the form of an L-shape. The outer end of the rear surface 118A is bent rearward at a right angle. The thus-bent portion is a flange portion 118B. The flange portion 118B is welded to an inner surface 60E of the rear portion of the rear wheel house inner member 60 (in the transverse direction of the vehicle) from the inner side.

The front end portion of an inward-facing surface of the rear reinforcer 118 is bent inward at a right angle so as to form a flange portion 118D. The flange portion 118D is welded to a rear surface 62A of the rear spring support member 62.

The depth of the L-shaped cross section of the upper end portion of the rear reinforcer 118 decreases gradually toward the end. Therefore, a flange portion 118E is formed continuous with the flange portion 118B and the flange portion 118D. The flange 118E is welded to the upper end portion of a rear surface 62A of the rear spring support member 62.

The depth of the L-shaped portion of the lower end portion of the rear reinforcer 118 also decreases gradually. Therefore, a flange portion 118F is formed continuous with the flange portion 118B and the flange portion 118D. The flange portion 118F is welded to the lower end of the inner surface 60E of the rear wheel house inner member 60 from the inner side.

Cross members 120 are disposed between the rear spring support members 62 on either side of the vehicle. The cross members 120 comprises a cross member upper piece 122 and a cross member lower piece 124. The cross-section normal to the transverse axis of the vehicle of the cross member upper piece 122 is in the form of a U-shape having its open side facing downwards. The two side end portions of each cross member upper piece 122 are wide portions 122A extending in the longitudinal direction of the vehicle. A cut portion 122B is formed in the wide portion 122A from the outer side. The peripheral edge of the cut portion 122B is welded to an upper surface 62B of the rear spring support member 62. The two side ends of an upper surface 122C of a cross member outer piece 122 are welded to a front surface 62C of the rear spring support member 62 and the upper end of the front reinforcer 116 so as to form a closed cross-sectional shape. The two side ends of the front surface 122E are bent forwards at a right angle so as to form a flange portion 112F. The flange portion 112F is welded to the flange portion 60B of the rear wheel house inner member 60.

The two side end portions of the rear surface 122G of the cross member outer piece 122 are welded to the rear surface 62A of the rear spring support member 62 and the upper end portion of the rear reinforcer 118 so as to form a closed cross-sectional shape. The two side ends of the rear surface 122G are bent rearward at a right angle so as to form a flange portion 122H. The flange portion 122H is welded to the flange portion 60B of the rear wheel house inner member 60.

A lower cross member 124 is welded to the lower piece portion of the cross member outer piece 122. The cross-sectional shape of the cross member lower piece 124 is arranged to be a U-shape having its open side facing downwards in which a front vertical flange portion 124B and a rear vertical flange portion 124C project from the two edges of a base portion 124A thereof. The front vertical flange portion 124B and the rear vertical flange portion 124C are welded to the lower end of the front surface 122E of the cross member outer piece 122 and the lower end of the rear surface 122G, respectively.

The two side ends (in the transverse direction of the vehicle) of the base portion 124A of the cross member lower piece 124 are bent downwards so as to form a flange portion 124D. The flange portion 124D is welded to an inner surface 62E of the rear spring support member 62 so as to form a closed cross-sectional shape.

Therefore, in the above-described rear structure of the body of a vehicle, the rear spring supports disposed at the two side ends are connected to each other by the cross members 120 forming closed sections. Furthermore, an approximately vertical closed cross-sectional shape is formed in the rear wheel house portion by the front reinforcer 116 and the rear wheel house inner member 60. Another vertical closed cross-sectional shape is formed by the rear reinforcer 118 and the rear wheel house inner member 60. In addition, closed cross-sectional shapes are formed on the outer surface of the upper portions of the rear wheel house 55 (not shown) and the rear spring support member 62 by the cross member 120, the front reinforcer 116, and the rear reinforcer 118.

Figure 19:
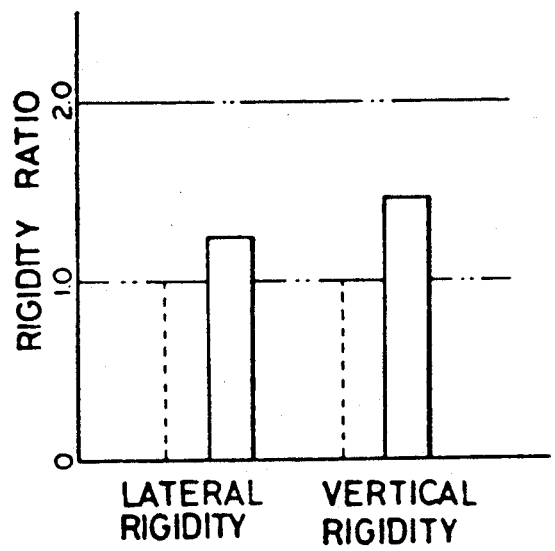
FIG. 19 is a graph which illustrates the rigidity ratio between the rigidity in the lateral direction and that in the vertical direction.

As a result, in the rear structure of the body of a vehicle according to this invention, local deformation in the vicinity of the point of application of force is minimized, causing the rigidity at the point of application of force to be improved. For example, the rigidity (designated by said bars in FIG. 19) at the point of application of force in the rear structure of the body of a vehicle is improved to the extent that the lateral rigidity is improved by about 1.3 times and the vertical rigidity is improved by about 1.5 times the rigidity (designated by a line consisting of short dashes in FIG. 19) of a structure in which the cross member 120, the front reinforcer 116 and the rear reinforcer 118 are not provided.

As a result of the structure formed as described above, the rigidity in the connection between the main body and the front body and the rigidity in the connection between the main body and the rear body is improved.

What is claimed is:

1. In a framing structure of a vehicle, an improvement comprising:
    elongated side sills disposed on each side in a lower portion of said vehicle, parallel to a longitudinal axis of said vehicle;
    rear spring supports disposed behind each said side sill;
    side members connected to each said side sill and extending towards a rear end of the vehicle;
    connection members for reinforcing each said side member by interconnecting rear ends of each said side sill to each said spring support respectively, said members being substantially straight, and lying in a substantially straight line,
    said side members, said side sills, and said spring supports being interconnected so as to be parallel to the longitudinal axis of the vehicle, when viewed in a plan view;
    first reinforcers disposed in parallel to a transverse axis of the vehicle on an outside of each said spring support; and
    second reinforcers disposed vertically and connected to each said first reinforcer,
    each of said first and second reinforcers supporting said spring supports, respectively, thereby improving the rigidity thereof, and therefore the rigidity in the connection between the main body and the rear body, and the bending and torsional rigidity of the framing structure.

2. A framing structure according to claim 1, wherein each said side member is provided on an inner side of each said sill and each said spring support.

3. A framing structure according to claim 1 further comprising:
    wheel house inner members connected to a rear portion of each said side sill and arranged to be in a semi-circular form partially surrounding a wheel.

4. A framing structure according to claim 3, wherein said connection members for reinforcing each said side member are disposed on each said wheel house inner member.

5. A framing structure according to claim 3, wherein said connection members for reinforcing each said side member have a cut portion at a rear end thereof for holding said spring supports.

6. A framing structure according to claim 3, wherein said connection members are disposed inside said wheel house inner members.

7. A framing structure according to claim 6, wherein a rear end portion of each said connecting member is curved so as to be inserted into each said wheel house member.

8. A framing structure according to claim 3, wherein said second reinforcers are disposed on an inner surface of each of said wheel house inner member.

9. A framing structure according to claim 1, wherein said spring supports have a vertically disposed axis and are held by each said connection member.

10. A framing structure according to claim 1, wherein longitudinal axes of said second reinforcers lie in a substantially straight line.

11. In a framing structure of a vehicle, an improvement comprising:
    wheel house inner members disposed at one end of said vehicle and fastened so as to partially surround respective wheels;
    spring supports disposed approximately at a longitudinal center of each said wheel house inner member, respectively;
    first reinforcers respectively disposed adjacent and in front of said spring supports, fastened approximately vertically along said wheel house inner members;
    second reinforcers respectively disposed at a rear end portion of said spring supports and fastened approximately vertically along each said wheel house inner member; and
    cross members disposed on two sides in a width direction of the vehicle for linking each of said spring supports;
    local deformations in a vicinity of a point of application of force being thereby minimized for improving supporting rigidity.

12. In a framing structure of a vehicle, an improvement comprising:

elongated side sills disposed on each side in a lower portion of said vehicle and parallel to a longitudinal axis of said vehicle;

rear spring supports disposed behind each said side sill;

side members connected to each said side sill and extending towards a rear end of the vehicle;

connection members for reinforcing each said side member by interconnecting rear ends of each said side sill to each said spring support respectively, said members being arranged to be substantially straight, and to lie in a substantially straight line, said side sills and said spring supports being interconnected so as to be parallel to the longitudinal axis of the vehicle, when viewed in a plan view;

first reinforcers disposed approximately vertically on an outer side of each said spring supports, said first reinforcers forming a truss structure in combination with said connection members; and second reinforcers disposed approximately vertically and connected to each said first reinforcer;

whereby, the rigidity of supporting structure surrounding and connected to said spring support is improved by the truss structure, the rigidity in the connection between the main body and the rear body is improved, and the bending and torsional rigidity of the framing structure is improved.

13. A framing structure according to claim 12, wherein each said side member is provided on an inner side of each said sill and each said spring support.

* * * * *